Figure 1:
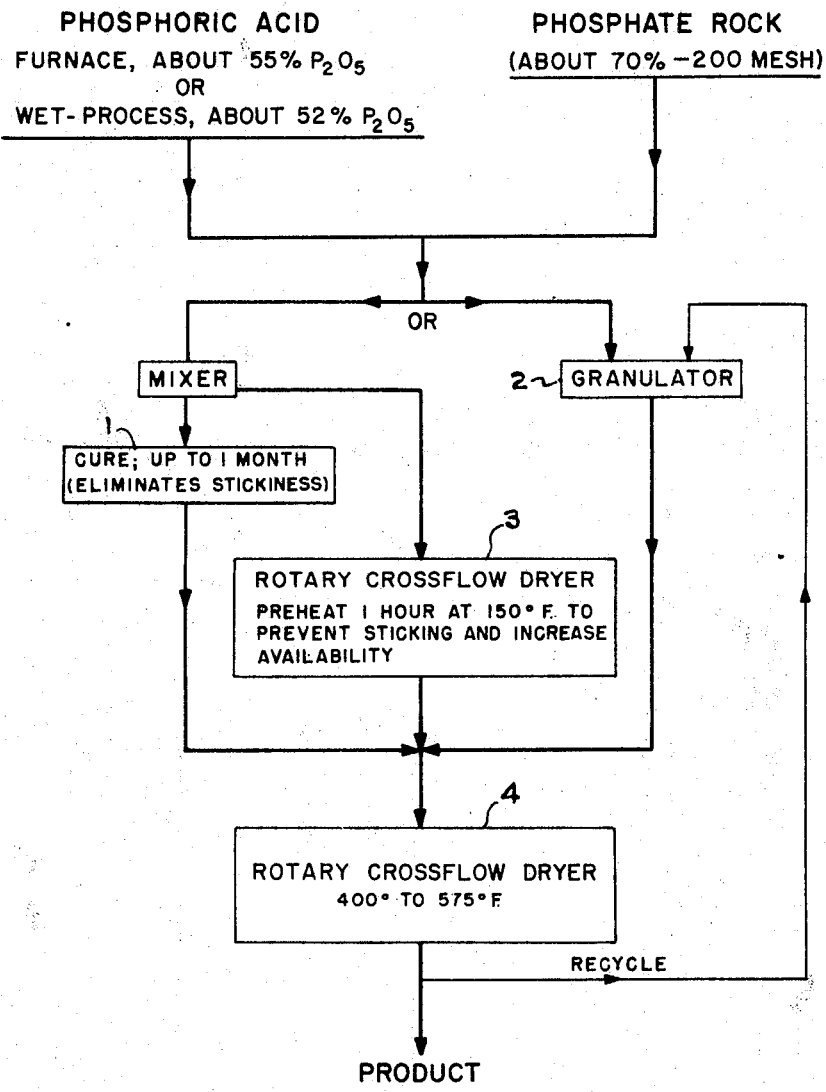

Sept. 28, 1965  J. R. LEHR ETAL  3,208,821
CALCIUM POLYPHOSPHATE FROM CONCENTRATED SUPERPHOSPHATE
Filed Nov. 20, 1961

James R. Lehr
John M. Potts
Larrabee D. Hand Jr. INVENTORS.

BY Robert A. Petruck
Agent

United States Patent Office 3,208,821
Patented Sept. 28, 1965

3,208,821
CALCIUM POLYPHOSPHATE FROM CONCENTRATED SUPERPHOSPHATE
James R. Lehr, John M. Potts, and Larrabee D. Hand, Jr., Florence, Ala., assignors to Tennessee Valley Authority
Filed Nov. 20, 1961, Ser. No. 154,113
3 Claims. (Cl. 23—109)
(Granted under Title 35, U.S. Code (1952), sec. 266)

The invention herein described may be manufactured and used by or for the Government for governmental purposes without the payment to us of any royalty therefor.

Our invention relates to a method for increasing the plant-nutrient content of phosphatic fertilizer, and more particularly to a process for the production of calicum polyphosphate from concentrated superphosphate.

The fertilizer industry has recognized a need for higher analysis fertilizers to effect savings in transportation and handling costs for a number of years. For this reason, there is an ever increasing demand for higher analysis phosphate materials for fertilizer uses. As higher analysis fertilizer materials become more widely available, it is expected that the demand for them will grow at the expense of the lower analysis fertilizers.

Heretofore, it has been the practice in the fertilizer industry to obtain the higher analysis phosphates by the production of new, higher analysis materials such as calcium metaphosphate, or the utilization of higher analysis phosphoric acid in the production of superphosphate. It has been suggested that a desirable method for existing superphosphate plants using regular acid would be to heat their products and increase the grade of the material by driving off some of the water to convert orthophosphate mainly to pyrophosphate and some polyphosphate, rather than to produce an entirely new material such as the highly condensed vitreous polyphosphate known in the trade as calcium metaphosphate.

The chemistry is this:

Orthophosphate $\xrightarrow{-H_2O}$ pyrophosphate $\xrightarrow{-H_2O}$ polyphosphate or

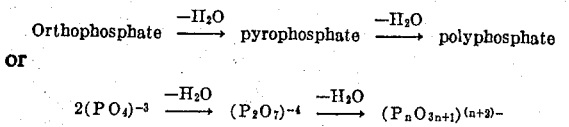

Phosphates more condensed than pyrophosphates are properly termed "polyphosphate." Actually the pyrophosphate ion constitutes the simplest "polyphosphate ion species" or limiting member of the series, where $n=2$; $3n+1=7$, and $(n+2)-=-4$ charge. Thus the term calcium "metaphosphate" is a misnomer—a trade name covering polyphosphates of calcium. Furthermore, the utilization of higher analysis phosphoric acid in the production of superphosphate is limited, in that the physical properties of the more concentrated acid are characterized by the fact that superphosphate made with the highly concentrated acid can contain only up to about 54 to 55 percent available $P_2O_5$. In other words, the concentrated superphosphate product can be upgraded by the use of more concentrated superphosphoric acid only up to a grade containing approximately 55 percent total available $P_2O_5$.

With reference to the prior-art processes of upgrading superphosphate materials produced with regular phosphoric acid and upgrading the product by heating to drive off water, the results of previous studies of such a heat treatment were not encouraging. The results of such studies may be found in Journal of the Association of Official Agricultural Chemists, vol. 24, 477–89 (1941). The results reported therein indicate that some degree of success was obtained in increasing fluorine evolution by heating; however, when the temperature used in the treatment was sufficiently high to increase the concentration appreciably (up to about 1100° F.) severe troubles were encountered in the dryer with sticking and ball formation and reversion of $P_2O_5$ to an unavailable form.

We have developed a method which overcomes these limitations of the prior art. We have found that we can appreciably upgrade concentrated superphosphate material by the production of calcium polyphosphate therefrom in a process which comprises acidulating phosphate rock with phosphoric acid; either curing, preheating, or granulating the acidulate; and then carefully and under controlled conditions heating the superphosphate.

We believe that in the case of heat treating the freshly acidulated material the presence of an acid film on the individual crystal surfaces effectively blocks the reaction of $Ca(H_2PO_4)_2 \cdot H_2O \rightarrow Ca(H_2PO_4)_2$ by a mechanism which promotes the reaction of $$Ca(H_2PO_4)_2 \cdot H_2O \rightarrow CaH_2P_2O_7$$

We have discovered that at the ultimate conversion of $Ca(H_2PO_4)_2$ to the gamma form of $Ca(PO_3)_2$ may be effected at much lower temperatures (370° F.) than are reported in the literature. In addition we believe that the very presence of water vapor in our system of heating the freshly acidulated material acts to block the ultimate conversion of $Ca(H_2PO_4)_2 \cdot H_2O$ to the beta form of $Ca(PO_2)_3$: the beta form being substantially citric-acid insoluble. The observed critical note of heating may therefore be explained by the necessity of maintaining certain equilibrium conditions between the individual crystals, the acid film present on the crystal surfaces, and the takeup of water from the crystal to the acid film and the loss of water from the acid film to the atmosphere. Furthermore, several new and advantageous features over conventional processes of the prior art are realized by the present invention.

Among these advantageous features are a product which has the advantage of being considerably higher in analysis than the usual grade of concentrated superphosphate; a product which, upon subsequent ammoniation, exhibits an agronomic advantage over conventional concentrated superphosphate material; a product high in both total $P_2O_5$ values and available $P_2O_5$ values; and a product having low moisture content.

It is therefore an object of the present invention to provide a method for the production of calcium polyphosphate from concentrated superphosphate.

Another object of the present invention is to provide a method for the production of calcium polyphosphate from concentrated superphosphate in which the product contains as much as 65 percent $P_2O_5$, of which as much as 99 percent is in available form.

Still another object of the present invention is to provide a process of treating concentrated superphosphate so as to upgrade the material and effect advantageous agronomic properties thereof.

A further object of the present invention is to provide a method of thermally treating concentrated superphosphate so as to increase its nutrient content by a process in which severe troubles of stickiness and ball formation in a dryer and reversion of $P_2O_5$ to an unavailable form are substantially eliminated.

In carrying out the objects of our invention in one form thereof, we heat concentrated superphosphate, either cured product or granular or preheated fresh material, under conditions to give relatively gentle handling of the material and to maintain a uniform temperature throughout the mass of material heated. We employ a dryer of the crossflow type in our process, since we have discovered that it is especially effective in attaining gentle handling and the desirable uniform temperature conditions. We have discovered that the temperature and the rate of heating that give best results in our process depend on the degree of curing the superphosphate material fed to the dryer.

In the instance wherein fresh material is used to avoid the expense of curing, we have found that it is desirable to either preheat or granulate the fresh acidulate in order to avoid sticking of the material in the dryer. By following the steps of our process, products of exceptionally high available $P_2O_5$ content can be obtained without appreciably reducing the proportion of the total $P_2O_5$ in the available form. In our process, for example, when using concentrated superphosphate previously prepared with furnace acid, products may be obtained having about 59 to 64 percent $P_2O_5$ contents and about 96 to 99 percent $P_2O_5$ availability. On the other hand, as shown in our discussion of the prior art, wherein efforts are made to upgrade the superphosphate by employing the use of highly concentrated furnace acid, the product obtained by such prior-art process contains only about 54 to 55 percent total $P_2O_5$.

Our invention, together with further objects and advantages thereof will be better understood from consideration of the following description, taken in connection with the accompanying drawing in which:

FIGURE 1 is a flowsheet illustrating principles of our novel process which results in a product having the properties mentioned above.

Referring now more specifically to FIGURE 1, the superphosphate employed therein may be prepared by any of the procedures presently employed in the industry for the manufacture of superphosphate. We have discovered that preventing the superphosphate from sticking or forming balls depends primarily upon using a crossflow-type dryer and heating the material in the proper manner. Other types of dryers may be employed; however, they should provide for gentle handling of the material. The superphosphate material may be cured for a period of approximately 1 month, as is shown at 1; however, fresh material can be handled by either granulating the fresh superphosphate as is shown at 2 or preheating the fresh superphosphate for approximately 1 hour at approximately 150° F., as is indicated at 3. In any event, when fresh material is introduced to rotary crossflow dryer at 4 it should be heated uniformly and slowly in order to yield satisfactory results. When ordinary furnace acid (55 percent $P_2O_5$) is used in making the fresh superphosphate, we have found that the material in the dryer may be heated preferably at a rate up to about 8° F. per minute. When wet-process acid (52 percent $P_2O_5$) is used, we have discovered that it is necessary to increase the temperature of the material in the dryer at a rate even slower than the above-mentioned 8° F. per minute. Only in the instance wherein cured superphosphate material is treated in the dryer, as would be the case of material coming from 1, has the rate of heating been found to be somewhat less critical. Therefore, although we have found that the preferred rate of heating may be up to about 8° F. per minute, we have determined that our process is operable under the other conditions outlined by employing a rate of heating in the range from about 6° F. per minute to about 12° F. per minute.

The available $P_2O_5$ content of the product of our process has been found to depend primarily upon the maximum temperature to which the material is heated and to a lesser degree on the retention time of the material at such maximum temperature. For instance, when furnace acid is used to prepare the superphosphate material, and a mole radio of $P_2O_5$:CaO of 1 is employed (calculated from the $P_2O_5$ contents of the acid and rock and the CaO content of the rock), the available $P_2O_5$ content has been observed to be about 59 percent when a maximum temperature of 400° F. is employed, and 64 percent when a maximum temperature of 575° F. is employed.

Most of the increase in concentration takes place during the heating-up period (up to about an hour, depending on heating rate). Therefore, relatively little is gained by holding the material at maximum temperature for any length of time. For example, the available $P_2O_5$ content is increased only about 2 percentage points by increasing the retention time from a few minutes to 1 hour at 400° F., and less than about 1 percentage point by a similar increase in retention time at 500° F. We have also observed that the $P_2O_5$ availability is dependent upon whether fresh or cured superphosphate is treated in the dryer. Under similar conditions, availability has been observed to be 3 to 4 percentage points lower when fresh superphosphate is employed. However, the availability of the product made with fresh superphosphate material can be increased to that obtained with cured material by increasing the $P_2O_5$:CaO mole ratio. Although increasing the $P_2O_5$:CaO mole ratio above 1 increases the availability of the product made with fresh material, the conversion of $P_2O_5$ to an available form is not proportionately increased.

If the maximum temperature employed in the dryer is too high, the $P_2O_5$ availability in the product will be deleteriously affected. We have found that the maximum temperature permissible depends upon the following factors:

(1) Whether furnace acid or wet-process acid is employed in producing the superphosphate material, and
(2) Whether or not the superphosphate material is cured prior to heating in the dryer.

Thus, for cured material, the maximum allowable temperature is about 575° F. when the superphosphate material treated has been produced with furnace acid. On the other hand, for cured material produced from wet-process acid, we have observed that the maximum allowable temperature for treatment in the dryer is about 500° F. However, when fresh superphosphate material made from furnace acid is treated in the dryer, the maximum temperature has been found to be approximately 450° F.; whereas if the fresh superphosphate is made from wet-process phosphoric acid, the maximum temperature has been found to be approximately 400° F.

In order that those skilled in the art may better understand how the present invention can be practiced, the following examples are given by way of illustrations, and not by way of limitation.

EXAMPLE I

Two small-scale tests were carried out, employing the process shown by the flowsheet in FIGURE 1. Cured superphosphate (48.2 percent total $P_2O_5$, 47.6 percent available $P_2O_5$) made from wet-process acid was heated batchwise in a small-scale, crossflow-type rotary dryer. In the first of these tests, the superphosphate was heated to 400° F. and maintained at that temperature for 15 minutes. The product contained 55.7 percent $P_2O_5$, and the availability was 98 percent. The $P_2O_5$ content was increased to 57.6 percent by increasing the temperature to 500° F. in the second test; the availability was still 98 percent. Further increasing the temperature lowered the availability. Almost half of the $P_2O_5$ was in the nonortho form, indicating conversion of polyphosphate. Petrographic examination of the product indicated that the principal constituent was calcium dihydrogen pyrophosphate.

EXAMPLE II

In other small-scale tests carried out as outlined in Example I, the product was made with cured superphosphate (48.8 percent total $P_2O_5$, 48.3 percent available $P_2O_5$) prepared from furnace acid. When this material was heated to 400° F., the $P_2O_5$ content was 58.1 percent and the availability was 98 percent. The $P_2O_5$ content was increased to 62.7 percent without lowering the availability, in tests wherein the maximum temperature was increased to 575° F. Further increase in the maximum temperature evidenced substantially lower availability in the product.

EXAMPLE III

The process outlined in Example I was carried out; however, phosphate rock was acidulated with furnace acid and the acidulate was granulated in a small-scale rotary drum. The material was then heated slowly to 400° F. in a small dryer. Upon reaching 400° F., the $P_2O_5$ content was found to be 57.2 percent. When this material was heated slowly to 400° F. and held at that maximum temperature for a period of approximately 1 hour, the $P_2O_5$ content was increased up to 59.8 percent. The availability was 96 percent in both the instance of a zero retention time and a 60-minute retention time.

EXAMPLE IV

Several tests were made according to the process described in Example I; however, the $P_2O_5$:CaO mole ratio was increased from 0.94 to 1.04. The fresh acidulate was preheated 1 hour at 150° F. without granulation, and subsequently heated slowly to 450° F. The $P_2O_5$ content of this material was 62.1 percent, and the availability was 97 percent.

In all of the tests referred to above, there was no trouble with sticking or ball formation. The FREE moisture contents of all of the products were found to be less than about 1 percent, i.e., clear distinction being made between "free" or adsorbed moisture and water content of the product in terms of water of constitution or water of hydration. Although the products in all of the tests showed a substantial upgrading in $P_2O_5$ content without the deleterious effect on availability, we have come to the conclusion that the preferred conditions of our process are as follows:

Acid _____ 55 percent $P_2O_5$.
Age of superphosphate __ Freshly cured.
Type of dryer _____ Rotary crossflow.
Maximum temperature __ 575° F.
Rock fineness _____ Approximately 70% through a standard 200 mesh screen.

The following table indicates the results of a number of small-scale tests referred to in the examples above. It is noted that tests 1 and 2 were conducted as in Example I; tests 3 and 4 were conducted as in Example II; test 5 was conducted as in Example III; and test 6 was conducted as in Example IV.

Table 1

| Age of superphosphate | Test Number | | | | | |
|---|---|---|---|---|---|---|
| | 1 | 2 | 3 | 4 | 5 | 6 |
| | Cured[1] | Cured[1] | Cured[1] | Cured[1] | Fresh[2] | Fresh[3,4] |
| Type of acid | W-P[5] | W-P[5] | F[6] | F[6] | F[6] | F[6] |
| Maximum temperature, °F | 400 | 500 | 400 | 575 | 400 | 450 |
| Retention time, minutes[7] | 15 | 15 | 0 | 0 | 0 / 60 | 0 |
| $P_2O_5$:CaO mole ratio | 0.95 | 0.94 | 0.94 | 0.94 | 0.94 | 1.04 |
| Chemical analysis, percent $P_2O_5$: | | | | | | |
| Total | 55.7 | 57.6 | 58.1 | 62.7 | 57.2 / 59.8 | 62.1 |
| A.P.A. | 54.4 | 56.1 | 56.7 | 61.1 | 54.7 / 57.3 | 59.9 |
| Nonortho, water soluble | 25.1 | 27.9 | 16.8 | 36.1 | 12.1 / 42.4 | 34.9 |
| $P_2O_5$ availability, percent | 98 | 98 | 98 | 98 | 96 / 96 | 97 |
| $P_2O_5$ conversion, percent | | | 92 | 91 | ---- / 86 | 87 |

[1] At least 1 month old.
[2] Less than 1 hour old; granular.
[3] Less than 1 hour old.
[4] Preheated 1 hour at 150° F.; nongranular.
[5] Wet-process acid.
[6] Furnace acid.
[7] Time held at maximum temperature; usually 15 to 30 minutes necessary to attain maximum temperature.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim and desire to secure by Letters Patent of the United States is:

1. In a method for treating concentrated superphosphate for effecting upgrading the agronomic properties thereof, wherein phosphate rock of such fineness that more than about 70 percent will pass through a 200-mesh screen is reacted with phosphoric acid containing in the range of about 52 to 55 percent $P_2O_5$ and curing the resulting monocalcium phosphate for about 30 days, the improvement which comprises the step of subsequently slowly and uniformly heating the cured monocalcium phosphate at a rate of about 6° F. to about 12° F. per minute up to a range from about 400° F. to about 575° F.; cooling the resulting treated calcium phosphate material and recovering said cooled and treated calcium phosphate material as product containing about 60 to 65 percent $P_2O_5$ of which about 96 to 99 percent is in the available form, said improvement being characterized by the fact that severe stickiness and ball formation during said slowly and uniformly heating step and reversion of $P_2O_5$ to an unavailable form therein are substantially eliminated.

2. In a method for treating concentrated superphosphate for effecting upgrading the agronomic properties thereof wherein phosphate rock of such fineness that more than about 70 percent will pass through a 200-mesh screen is reacted with phosphoric acid containing in the range of about 52 to 55 percent $P_2O_5$ and granulating the resulting monocalcium phosphate, the improvement which comprises the step of subsequently slowly and uniformly heating the granulated monocalcium phosphate at a rate of about 6° F. to about 12° F. per minute up to a range from about 400° F. to about 575° F.; cooling the resulting treated calcium phosphate material and recovering said cooled and treated calcium phosphate material as product containing about 60 to 65 percent $P_2O_5$, of which about 96 to 99 percent is in the available form, said improvement being characterized by the fact that severe stickiness and ball formation during said slowly and uniformly heating step and reversion of $P_2O_5$ to an unavailable form therein are substantially eliminated.

3. In a method for treating concentrated superphosphate for effecting upgrading the agronomic properties thereof wherein phosphate rock of such fineness that more than about 70 percent will pass through a 200-mesh screen is reacted with phosphoric acid containing in the range of about 52 to 55 percent $P_2O_5$ and preheating the resulting monocalcium phosphate for about 1 hour at a temperature of about 150° F., the improvement which comprises the step of subsequently slowly and uniformly heating the preheated monocalcium phosphate at a rate of about 6° F. to about 12° F. per minute up to a range from about 400° F. to about 575° F.; cooling the resulting treated calcium phosphate material and recovering said cooled and treated calcium phosphate material as product containing about 60 to 65 percent $P_2O_5$, of which about 96 to 99 percent is in the available form, said improvement being characterized by the fact that severe stickiness and ball formation during said slowly and uniformly heating step and reversion of $P_2O_5$ to an unavailable form therein are substantially eliminated.

References Cited by the Examiner

UNITED STATES PATENTS

| 1,780,620 | 11/30 | King | 23–109 |
| 1,985,810 | 12/34 | Wight et al. | 23–109 X |
| 2,021,671 | 11/35 | Skinner | 23–109 |
| 2,173,826 | 9/39 | Curtis | 71–41 X |
| 2,384,814 | 9/45 | Coleman | 23–109 |

OTHER REFERENCES

Marshall et al.: "Industrial and Engineering Chemistry," vol. 25, No. 11, November 1933, pages 1253–1259 (copy in Science Library). Photocopy 71–41.

MAURICE A. BRINDISI, *Primary Examiner.*

UNITED STATES PATENT OFFICE
CERTIFICATE OF CORRECTION

Patent No. 3,208,821                        September 28, 1965

James R. Lehr et al.

It is hereby certified that error appears in the above numbered patent requiring correction and that the said Letters Patent should read as corrected below.

Column 2, line 17, strike out "at"; line 24, for "$Ca(PO_2)_3$" read -- $Ca(PO_3)_2$ --; line 25, for "note" read -- rate --; line 71, after "curing" insert -- of --; column 3, line 65, for "radio" read -- ratio --; column 4, line 56, for "of" read -- to --.

Signed and sealed this 12th day of April 1966.

(SEAL)
Attest:

ERNEST W. SWIDER                             EDWARD J. BRENNER
Attesting Officer                                   Commissioner of Patents